United States Patent
Maurissens et al.

(10) Patent No.: US 11,441,883 B2
(45) Date of Patent: Sep. 13, 2022

(54) BIDIRECTIONAL WIRELESS DETONATOR SYSTEM

(71) Applicant: DETNET SOUTH AFRICA (PTY) LTD, Johannesburg (ZA)

(72) Inventors: Daniel August Julien Louis Maurissens, Orbe (CH); Elmar Lennox Muller, Johannesburg (ZA)

(73) Assignee: DETNET SOUTH AFRICA (PTY) LTD, Johannesburg (ZA)

( * ) Notice: Subject to any disclaimer, the term of this patent is extended or adjusted under 35 U.S.C. 154(b) by 0 days.

(21) Appl. No.: 17/268,035

(22) PCT Filed: Aug. 15, 2019

(86) PCT No.: PCT/ZA2019/050046
§ 371 (c)(1),
(2) Date: Feb. 11, 2021

(87) PCT Pub. No.: WO2020/037337
PCT Pub. Date: Feb. 20, 2020

(65) Prior Publication Data
US 2021/0318107 A1   Oct. 14, 2021

(30) Foreign Application Priority Data
Aug. 16, 2018   (ZA) .................................. 2018/05468

(51) Int. Cl.
*F42D 1/05*   (2006.01)
*F42D 1/055*   (2006.01)
(Continued)

(52) U.S. Cl.
CPC ............... *F42D 1/055* (2013.01); *F42D 3/04* (2013.01); *H04W 4/80* (2018.02)

(58) Field of Classification Search
CPC ... F42D 1/055; F42D 1/05; F42D 3/04; F42D 1/02; F42B 3/11; F42B 3/113
(Continued)

(56) References Cited

U.S. PATENT DOCUMENTS 7,810,430 B2 * 10/2010 Chan ...................... F42B 3/121
  102/214
9,568,294 B2 * 2/2017 Morris .................... F42C 13/06
(Continued)

FOREIGN PATENT DOCUMENTS

WO   2013116938 A1   8/2013

OTHER PUBLICATIONS

International Preliminary Report on Patentability for PCT/ZA2019/050046, international filing date of Aug. 15, 2019, date of completion Apr. 7, 2020, 11 pages.
(Continued)

*Primary Examiner* — Michael D David
(74) *Attorney, Agent, or Firm* — Cantor Colburn LLP

(57) ABSTRACT

A blasting system which includes control equipment and a plurality of detonators which are located in respective boreholes formed in rock, wherein signals from the detonators are magnetically transmitted wirelessly through the rock to the control equipment via different paths between successive detonators, and wherein a signal from the control equipment can be simultaneously transmitted to all of the detonators.

11 Claims, 2 Drawing Sheets

(51) Int. Cl.
*H04W 4/80* (2018.01)
*F42D 3/04* (2006.01)

(58) Field of Classification Search
USPC ......... 102/206, 215, 262, 217, 218; 361/248
See application file for complete search history.

(56) References Cited

U.S. PATENT DOCUMENTS

| | | | |
|---|---|---|---|
| 10,295,323 B2* | 5/2019 | Kotsonis | .................... F42D 1/05 |
| 10,429,162 B2* | 10/2019 | Papillon | .................. F42D 1/045 |
| 11,029,135 B2* | 6/2021 | Howe | ..................... F23Q 21/00 |
| 2008/0041261 A1 | 2/2008 | Hummel et al. | |
| 2009/0193993 A1 | 8/2009 | Hummel et al. | |
| 2017/0074625 A1 | 3/2017 | Appleby et al. | |
| 2021/0302143 A1* | 9/2021 | Maurissens | ............... F42D 1/05 |

OTHER PUBLICATIONS

International Search Report for PCT/ZA2019/050046, international filing date of Aug. 15, 2019, dated Nov. 26, 2019, 3 pages.
Written Opinion for PCT/ZA2019/050046, international filing date of Aug. 15, 2019, dated Nov. 26, 2019, 6 pages.

* cited by examiner

BIDIRECTIONAL WIRELESS DETONATOR SYSTEM

CROSS-REFERENCE TO RELATED APPLICATIONS

This application is a U.S. national stage application of International Application No. PCT/ZA2019/050046 entitled "BIDIRECTIONAL WIRELESS DETONATOR SYSTEM", which has an international filing date of 15 Aug. 2019, and which claims priority to South African Patent Application No. 2018/05468, filed 16 Aug. 2018.

BACKGROUND OF THE INVENTION

This invention relates to a detonator system.

US2008/0041261 relates to a wireless blasting system in which at least two components are adapted to communicate with each other over a short range wireless radio link. Use is made of so-called identification code carriers which are associated with respective detonators. The code carriers are capable of communication with each other and with a blast box.

Communication may be effected using various protocols, such as the Bluetooth protocol which operates at a frequency of about 2.45 g Hz.

The specification of the aforementioned application also describes certain problems which are encountered when electronic blasting systems which are interconnected by way of wires are used in diverse sites. The use of a short range, high frequency, wireless radio link is intended to address some of these problems. However, the amplitude of a high frequency radio signal in rock is rapidly attenuated. It is then not feasible to communicate directly with a detonator in a borehole. If the equivalent of an identification code carrier is used on a rock surface then the carrier is exposed to the prevailing environmental conditions and can easily be damaged and thereby rendered useless.

A magnetic signal at a frequency of, say, less than 20 kHz can however penetrate rock and soil without undue attenuation. It is then possible to make use of a transmitting antenna with a relatively large area which is positioned at a suitable protected location and which transmits at a power of several tens of watts communication signals to detonators which have appropriate receivers and which are placed in boreholes in the rock. This approach, which enables the use of the identification code carriers or equivalent devices to be dispensed with, is essentially of a unidirectional nature. Reliable communication links can be established from the transmitter to the various antennas which are associated with the detonators in the boreholes but, due to physical limitations of magnetic field propagation, it is not feasible to transmit from each detonator a signal in the reverse direction, over the same distance, to a receiving antenna which may be the same as a transmitting antenna.

A direct drawback thus is that a one-way communication process does not allow an operator to establish whether all detonators are receiving signals correctly from the transmitter. This means that there is no way of determining whether commands to the detonators from a control mechanism are being properly received. The absence of feedback from a detonator to the control mechanism means that safety and functional requirements are, inevitably, compromised.

An object of the present invention is to address at least to some extent the aforementioned situation.

SUMMARY OF INVENTION

The invention is based on the use of a near-field magnetic induction communication technique in which a transmitter coil in one device is used to modulate a magnetic field which is measured by means of a receiver coil in another device.

The power density of a far-field transmission attenuates at a rate which is proportional to the inverse of the range to the $2^{nd}$ power $$\left(\frac{1}{r2}\right)$$

or −20 db per decade. By way of contrast a near-field magnetic induction system is designed to contain transmission energy within a localised magnetic field which does not radiate into free space. The power density of a near-field transmission does, however, attenuate at a rate which is proportional to the inverse of the range to the $6^{th}$ power $$\left(\frac{1}{r6}\right) \text{ or} - 60$$

db per decade. A cross over point between a near-field transmission and a far-field transmission occurs at an approximate distance of (wavelength of operation)/($2\pi$). Utilization of the aforementioned factors means that a relatively low powered transmitter functioning at a frequency of, say, 4 kHz which is associated with a detonator inside a borehole is capable of transmitting a signal through rock over a meaningful distance of say, several, or even tens of, meters.

The invention provides a blasting system which includes a control antenna, control equipment and a plurality of detonators, wherein each detonator includes a respective transmitter and receiver and is adapted to communicate in a two-directional manner with a restricted number of detonators in adjacent boreholes, whereby a signal from the control equipment is relayed in succession via the respective transmitters and receivers of at least some of the plurality of detonators along a plurality of outbound paths to all the plurality of detonators, and a signal from any detonator is relayed in succession via the respective transmitters and receivers of at least some of the plurality of detonators along a respective inbound path to the control equipment, and wherein the control equipment is operable to transmit a signal from the control antenna simultaneously to all of the detonators.

The invention also provides a blasting system which includes a plurality of detonators each of which is located in a respective borehole, a control antenna, control equipment which is adapted to generate and to transmit a signal using the control antenna to each detonator, and a sink detonator which is in direct communication with the control equipment, wherein each detonator is configured to communicate with a limited number of adjacent detonators whereby a signal from any detonator is relayed via successive detonators to the sink detonator which transmits the signal to the control equipment.

The blasting system is preferably based on the use of a plurality of detonators each of which respectively includes a respective said transmitter which, when actuated, transmits a first signal at a known, predetermined signal strength, a respective said receiver which, in operation, receives said first signal from another detonator which is the same as said detonator and which is displaced by a distance from said detonator, a comparator which compares the strength of the transmitted first signal to the strength of said received first signal, and a processor, responsive to the comparator, operable to provide a measurement of the difference between the strength of the transmitted first signal and the received first signal.

The aforementioned difference provides a measure of the degree of attenuation of strength of the first signal as it travels through the rock to the receiver. The measurement of attenuation is related to and is dependent on the distance (through rock) travelled by the first signal from the transmitter to the receiver.

The detonator includes a memory unit in which is stored a unique identifier.

BRIEF DESCRIPTION OF THE DRAWINGS

The invention is further described by way of example with reference to the accompanying drawings in which.

DESCRIPTION OF PREFERRED EMBODIMENT

Figure 1:
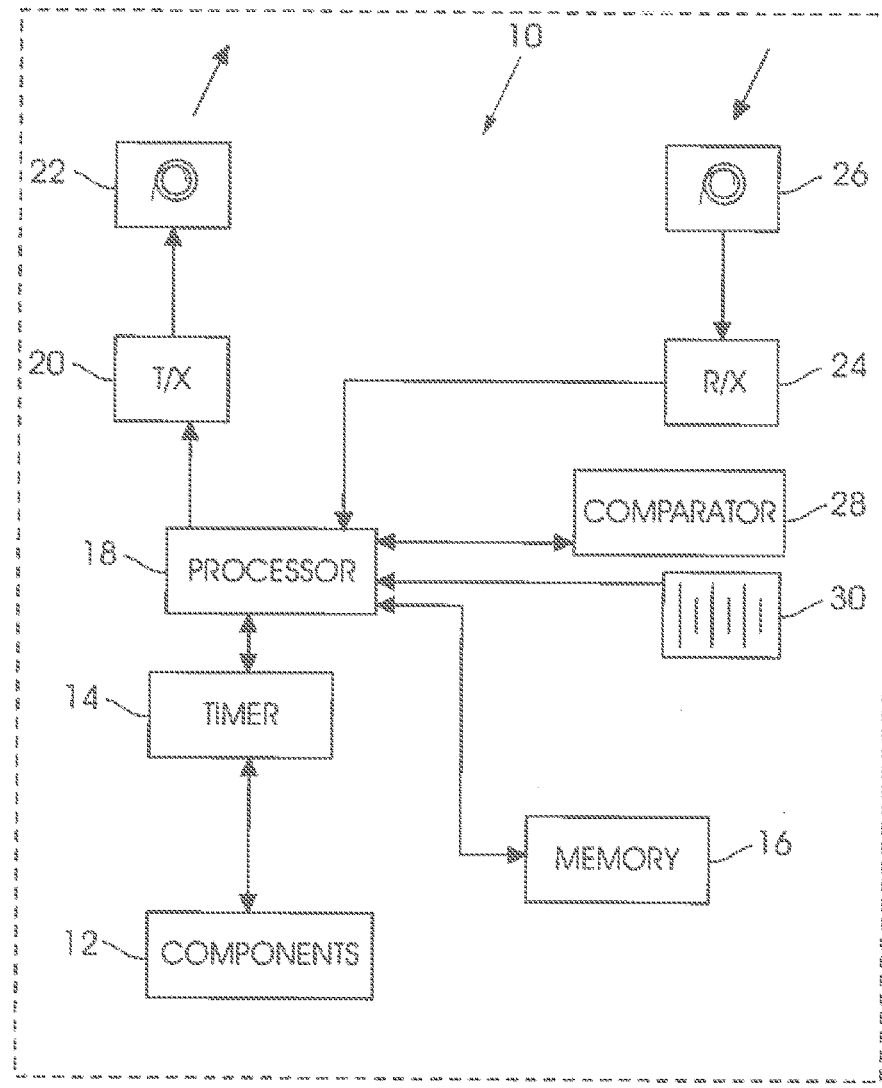
FIG. 1 is a block diagram representation of a detonator which is used in the system of the invention.

FIG. 1 of the accompanying drawings illustrates in block diagram form a detonator 10 which is used in the system of the invention.

The detonator 10 includes detonating components 12, of known elements, such as an initiator, a primary explosive and the like. These aspects are not individually shown nor described herein for they are known in the art.

The detonator 10 further includes a timer 14, a memory 16 in which is stored a unique identifier for the detonator, a processor 18, a transmitter 20 which is controlled by the processor 18 and which emits a signal through a custom-designed coil antenna 22, a receiver 24 which is connected to the processor 18 and which is adapted to receive a signal detected by a custom-designed coil antenna 26, and a comparator 28.

A battery 30 is used to power the electronic components in the detonator and to provide energy to the initiator to fire the detonator when required.

In use, the transmitter 20 produces a magnetic field which is transmitted by the antenna 22. The magnetic field is modulated with information output by the processor 18 in order to transmit information from the detonator. Similarly, the receiver 26 is adapted to decode a modulated magnetic field signal which is received by the antenna 26 and to feed information, derived from the demodulation process, to the processor 18. The receiver and transmitter function at a frequency of the order of 4 kHz.

Figure 2:
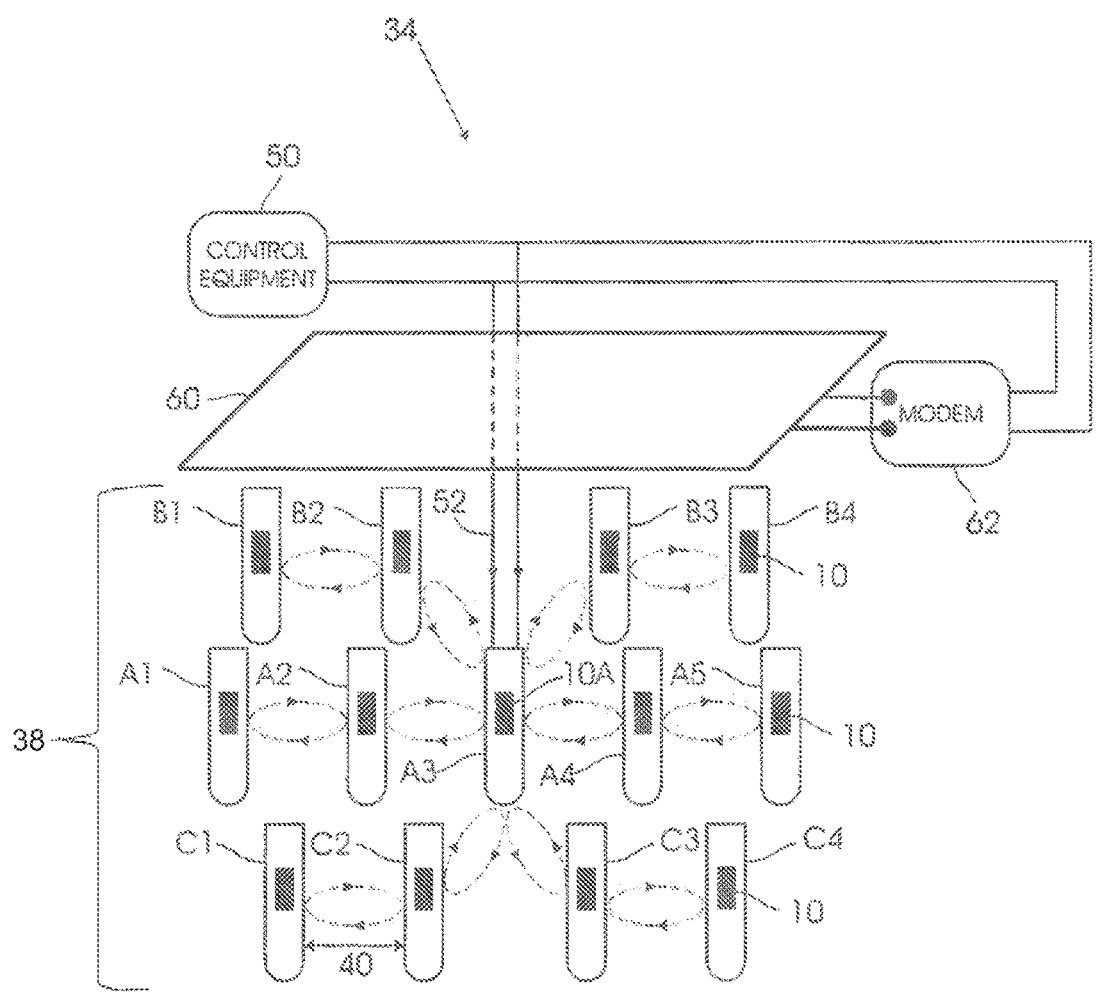
FIG. 2 is a representation of a plurality of detonators which are included in a blasting system which has a two or three-dimensional mesh network configuration, according to the invention.

FIG. 2 illustrates a detonator system 34 according to the invention which includes a plurality of boreholes 38 which are drilled in a body of rock in, say, an underground location. The boreholes are in any appropriate two or three-dimensional configuration. The spacings 40 between the boreholes 38, the depth of each borehole, and the position of each borehole, are determined by the application of known principles which are not described herein. Each borehole 38 is charged with an explosive composition and is loaded with at least one detonator 10 of the kind described in connection with FIG. 1. For ease of identification the borehole installations are labelled A1 to A5, B1 to B4, C1 to C4. The corresponding detonators are then referred to 10A1 to 10A5, 10B1 to 10B4 and 10C1 to 10C5.

The detonator system 34 also includes control equipment 50 which is used to establish and measure parameters of the blasting system in accordance with operating and safety techniques. The control equipment 50 is adapted to receive signals from the various detonators and to transmit signals to the various detonators as is described hereinafter. The control equipment 50 is connected to a large area control antenna 60.

The control equipment 50 is connected to the detonator 10A3, referred to herein for ease of identification as a sink detonator, via a physical link 52 such as conductive wires or a fibre optic cable. A signal generated by the control equipment 50 is transmitted via the link 52 to the sink detonator 10A3. Alternatively the control equipment 50 transmits a signal via the antenna 60 to the receiver in the sink detonator 10A3.

In each case information carried by this signal is extracted and that information is used to modulate a magnetic signal which is generated by the respective transmitter 20 in the detonator 10A3. A resulting near-field modulated magnetic signal is then transmitted from the coil antenna 22 of the detonator 10A3.

As is explained hereinafter it is possible for a signal generated at the control equipment 50 to be transmitted via the mesh network to a particular predetermined detonator and for a signal to be returned from that detonator to the control equipment 50. In each instance the signal is relayed sequentially from one detonator to another and is guided to its particular destination.

Assume that the sink detonator 10A3 transmits a signal which is received by a number of adjacent detonators. In FIG. 2 these adjacent detonators are illustrated at least as the detonators 10B2, 10B3, 10A2, 10A4, 10C2 and 10C3.

Included in each modulated transmitted signal is the unique identifier of the detonator 10A3, taken from the memory 16.

Each detonator which receives a signal from the detonator 10A3 then transmits a responsive signal. Referring again by way of example only to the detonator 10A2 the respective components in the detonator 10A2 cause the generation of a modulated magnetic signal which is transmitted via the respective coil antenna 22. That transmitted signal carries information identifying the sequential path from the control equipment 50, to the detonator 10A3, and to the detonator 10A2, and is received at least by the adjacent detonators in the installations A1, C1, C2 and A3.

The process continues in this manner until each detonator has received a corresponding signal which originated from the control equipment 50. It should be borne in mind that each transmitted signal travels in three dimensions. However, for explanatory purposes herein, signal propagation is described as taking place in two dimensions.

Subsequently, a signal containing the identifiers of the respective detonators is propagated along various paths through the mesh network towards the sink detonator 10A3 which, in turn, transfers such signal to the control equipment 50.

The control equipment 50 is then capable of establishing a computer representation of the configuration which is shown in FIG. 2 i.e. of the various boreholes and the detonators, the identities of the detonators and the distance between each adjacent pair of boreholes. The last mentioned parameter may be assessed, with a reasonable degree of precision, by measuring the extent to which the amplitude of a transmitted signal is attenuated by the time the signal is received. Through the use of appropriate software the control equipment 50 determines how a signal which is intended for any particular detonator 10, which is identified uniquely by means of its identity number, can be sent through the mesh network of detonators. Additionally, the aforementioned process enables each detonator to establish the identity of each adjacent detonator with which it can communicate in a bi-directional manner.

Once the routing information has been established it is possible for the control equipment 50 to generate a message that is intended for any particular detonator, as identified by its identity number, and then to transmit an outbound message which is intended only for that detonator. In the return direction a detonator can, for example, after carrying out integrity and functional capability tests, generate and transmit an inbound signal to the control equipment 50. In each instance, the signal goes along a pre-determined path which is determined primarily by the routing information referred to. The control equipment 50 is then able to verify the integrity of the entire blasting system before initiating a fire signal.

It is apparent from the aforegoing that a signal originated at the control equipment 50 which is transferred to the sink detonator 10A3, can be relayed via successive detonators on an outbound path to a target detonator. Thus, the outbound path is determined by a sequence of said unique identifiers respectively associated with the respective plurality of detonators along said outbound path.

Conversely, a signal from any detonator can be relayed on an inbound path via successive detonators to the sink detonator 10A3 and then to the control equipment. Thus, the inbound path is determined by a sequence of said unique identifiers respectively associated with the respective plurality of detonators along said inbound path.

However due to the low frequency of operation and the fact that direct transmission of a signal from the control equipment to a target detonator does not take place the data transmission rate is low. This presents difficulties when the detonators are to be synchronised for arming and firing.

To address the aforementioned problem it is thus possible for the control equipment 50 to generate and apply a signal to the control antenna 60 which can then reliably transmit through several hundreds of meters of rock a single signal simultaneously to each of the detonators. The signal is received at each detonator by the associated receiver antenna and receiver. Typically, therefore, all preliminary signal transmissions which are required to establish the blasting system and to verify its integrity are carried out by transmitting signals from the control equipment 50 to the sink detonator A3 and then from the sink detonator along specific routes to the various target detonators. Each detonator, in return, transmits a signal via one or more intermediate detonators to the sink detonator A3 which transfers each received signal to the control equipment 50. Thus two-way communication between the control equipment and the various detonators is possible.

In the return direction the signal relaying technique is used to transmit information from each detonator to the control equipment 50. As an alternative the antenna 60 is used to transmit, directly through the rock, a signal to any specific detonator which is identified by an identifier.

In order to synchronise the detonators so that, for example, the detonators work from a common clock, a signal is transmitted at the appropriate time from the control equipment 50 via the large area control antenna 60 simultaneously to all the detonators. For example a signal is sent to all the detonators to ensure that they enter an arm mode simultaneously, and each detonator is then armed at the same time. In a similar way a fire signal transmitted by the control equipment 50 via the large area control antenna 60 is received by each detonator substantially simultaneously and, after executing a pre-determined time delay (if any) at each detonator, the respective detonator is fired.

The signal which is generated by the control equipment 50 and then transmitted by the large area control antenna 60 is preferably modulated using an appropriate modem 62. If use is made of quadrature phase shift keying (QPSK) then, with four phases, a QPSK system can incur two bits per symbol and achieve double the date rate of transmission compared with a BPSK system (binary phase shift keying) while maintaining the same bandwidth of the signal. Alternatively, the data rate of BPSK can be maintained but the required bandwidth is halved.

The invention claimed is:

1. A blasting system which includes a control antenna, control equipment and a plurality of detonators, wherein each detonator is located in a respective borehole formed in rock and includes a respective transmitter and receiver and is adapted to magnetically communicate wirelessly through the rock in a two-directional manner with a number of detonators, fewer than all of the plurality of detonators, which number of detonators are disposed in adjacent boreholes, whereby a signal from the control equipment is transmitted by the control antenna through the rock and is then relayed in succession via the respective transmitters and receivers of at least some of the plurality of detonators along a plurality of outbound paths in the rock to all the plurality of detonators, and a signal from any detonator is relayed in succession via the respective transmitters and receivers of at least some of the plurality of detonators along a respective inbound path in the rock to the control antenna, and wherein the control equipment is operable to transmit a signal from the control antenna through the rock simultaneously to all of the detonators.

2. A blasting system according to claim 1 wherein one of said plurality of detonators is a sink detonator which is in direct communication with the control equipment.

3. A blasting system according to claim 2 wherein each detonator is configured to communicate wirelessly through the rock with a number of adjacent detonators, fewer than all of the plurality of detonators, whereby a signal from any detonator is relayed via successive detonators to the sink detonator, which transmits the signal to the control antenna.

4. A blasting system according to claim 2 wherein the control equipment is connected to the sink detonator by means of a physical link.

5. A blasting system according to claim 2 wherein the control equipment is in signal communication with the sink detonator via the control antenna.

6. A blasting system according to claim 1 wherein each of said signals is at a frequency of 4 kHz, and is modulated to carry information.

7. A blasting system according to claim 1 wherein each of said plurality of detonators includes a respective unique identifier.

8. A blasting system according to claim 7 wherein each said outbound path is determined by a sequence of said unique identifiers respectively associated with the respective plurality of detonators along said outbound path.

9. A blasting system according to claim 7 wherein each said inbound path is determined by a sequence of said unique identifiers respectively associated with the respective plurality of detonators along said inbound path.

10. A blasting system according to claim 1 wherein said signal which is transmitted by the control equipment simultaneously to all the detonators is selected from a signal to synchronize the operation of the detonators; a signal to arm the detonators; and a signal to fire the detonators.

11. A blasting system according to claim 1 wherein each of said plurality of detonators includes a respective said transmitter which, when actuated, transmits a first signal at a known, predetermined signal strength, a respective said receiver which, in operation, receives said first signal from another detonator which is the same as said detonator and which is displaced by a distance from said detonator, a comparator which compares the strength of the transmitted first signal to the strength of said received first signal, and a processor, responsive to the comparator, operable to provide a measurement of the difference between the strength of the transmitted first signal and the received first signal.

* * * * *